United States Patent [19]

Horstmann

[11] 3,916,864
[45] Nov. 4, 1975

[54] COMPRESSION-IGNITION ENGINE
[75] Inventor: Bernhard Horstmann, Neuss, Germany
[73] Assignee: International Harvester Company, Chicago, Ill.
[22] Filed: June 10, 1974
[21] Appl. No.: 477,948

[52] U.S. Cl. .......................... 123/191 R; 123/193 P
[51] Int. Cl.² ...................... F02B 23/00; F02F 3/26
[58] Field of Search ............ 123/32 ST, 30 C, 30 D, 123/32 K, 32 B, 32 SP, 32 SA, 191 S, 191 SP, 193 CP, 193 P, 75 B

[56] References Cited
UNITED STATES PATENTS

| 2,881,743 | 4/1959 | Holt | 123/32 B |
| 2,898,894 | 8/1959 | Holt | 123/32 B |
| 3,144,008 | 8/1964 | List | 123/32 B |
| 3,154,059 | 10/1964 | Witzky et al. | 123/32 SA |
| 3,658,046 | 4/1972 | Winkler | 123/32 C X |
| 3,766,900 | 10/1973 | Aiti | 123/193 P X |
| 3,797,466 | 3/1974 | Nambu | 123/195 P X |

Primary Examiner—Charles J. Myhre
Assistant Examiner—William C. Anderson
Attorney, Agent, or Firm—Raymond E. Parks; Floyd B. Harman

[57] ABSTRACT

A compression-ignition engine which has a precombustion and a main combustion chamber in the crown of the piston.

9 Claims, 5 Drawing Figures

3,916,864

COMPRESSION-IGNITION ENGINE

CROSS REFERENCE TO A RELATED APPLICATION

United States abandoned patent application Ser. No. 792,039, filed on Jan. 17, 1969, by Rudolf W. Guertler — corresponds to German Pat. No. 2,001,518.

BACKGROUND OF THE INVENTION

This invention relates to a combustion system of an internal combustion engine using direct fuel injection and producing a rotary movement of the air entering a piston cylinder to generate a vortex motion around the axis of the cylinder which houses the piston.

FIELD OF THE INVENTION

In the field of manufacturing Diesel engines, combustion systems using direct fuel injection are presently rated, among the commonly applied techniques of injecting fuel to obtain a blending of fuel and air, by which not only the finest possible dispersion of the liquid fuel is to be achieved, but also a most uniform blending with the compressed hot air in the combustion chamber.

DESCRIPTION OF THE PRIOR ART

With direct fuel injection, the fuel is injected at high pressure directly into the combustion chamber. It is atomized there and then, by means of the air movement and dispersed in the combustion chamber. By the specific design of the combustion chamber, the arrangement of the fuel jets, the atomization, the proportioning of the penetrating power of the fuel jets, and the air movement in the combustion chamber one attempts to achieve an optimal fuel to air into or blend. Owing to their comparatively fast combustion, combustion systems applying direct injection produce extensive noise and emit considerable quantities of contaminated exhaust gases. They also produce comparatively high combustion temperatures and combustion peak pressures. These disadvantages are largely avoided with the application of a pre-combustion chamber system. On engines designed according to the pre-combustion chamber system the combustion chamber is divided into a precombustion chamber, which is incorporated in the cylinder head, and a main combustion chamber which is positioned between the bottom edge of the cylinder head and the heads of the piston or crown.

The pre-combustion chamber into which the fuel is injected and in which only a partial combustion takes place is connected to the main combustion chamber by means of a narrow slot or a narrow channel. This two-stage or stepped combustion produces lower combustion pressures than generally encountered with direct fuel injection. The complete combustion cycle or process is throttled by dividing it into two individual periods. The pre-combustion chamber system on the one hand reduces the combustion pressure in the main combustion chamber, but on the other hand results in an increased fuel consumption. Therefore, the precombustion chamber system in terms of fuel consumption is very costly.

SUMMARY OF THE INVENTION

The present invention is based on the task of improving a combustion system of the initially mentioned type in such a way that the advantages of the direct fuel injection system and of the precombustion chamber design are utilized without the aforementioned disadvantages of said system. Of importance is that, at negligible expense and low combustion peak pressures and peak temperatures, the new technique will provide low exhaust gas and noise emission.

According to the invention this problem is solved by splitting the combustion process inside the piston into several stages. In an appropriate manner the combustion process extends over two consecutive stages. During the first stage an incomplete combustion at low combustion temperatures takes place, whereas the second stage is the one during which a complete and rapid combustion takes place.

By means of this invention a two-stage combustion for direct fuel injection is achieved. During the second combustion stage, the gases can disperse or spread over the entire piston head without any occurrance of loss due to an overflow action at a throttle point.

Compared with the presently used one-stage systems, this novel type of two-stage combustion system for direct fuel injection presents considerable advantages which becomes apparent most of all by extreme low combustion peak pressures and peak temperatures in the combustion chamber and by low exhaust gas and noise emission. The application of this technique does not require any great modifications and can, therefore, be effected at a negligible cost increase as regards the production of the internal combustion engine.

The teachings of the invention may be applied on any internal combustion chamber having the following characteristics:

a. direct fuel injection by means of an injection nozzle, b. a combustion chamber arranged in the piston, and c. a vortex air motion around a longitudinal axis of the cylinder, according to the invention the combustion chamber in general must be designed in form of at least two individual chambers which are arranged in the piston head and are in junction with each other.

As regards the internal combustion engine according to this invention it is of importance that both combustion chambers are arranged in the same member, in this case the piston of the internal combustion engine, so that the incorporation introduction of the system according to this invention only requires altering this one member, the piston, of the internal combustion engine. This way it is made feasible to split the combustion process into two stages. A comparatively throttled combustion is achieved which in turn takes a favourable effect on both, exhaust gas and noise emission. Except for a slight rise in combustion gas pressure, the combustion peak pressure is lower and lower peak temperatures are obtained in the combustion chamber. Since such a design and arrangement of the combustion chambers in the piston head can easily already be taken care of during manufacture of the piston, no difficulties worth mentioning will be encountered with production of an internal combustion engine according to this invention, or with any change to the combustion system according to this invention respectively.

A piston-type internal combustion engine using direct fuel injection and having an axially symmetrically arranged combustion chamber in the piston became known already through the DAS (German Published Application now German Pat. No. 2,001,518. On this engine the combustion chamber is divided into two sections by means of a guide member extending from the bottom of the combustion chamber up to the piston head top edge. At the ends of the guide member said sections are in junction with each other. By way of an injection nozzle arranged in the vicinity of the guide member end the fuel is injected exclusively into the smaller section which is formed by the guide member and the wall of the combustion chamber. The purpose of this design is to inject the fuel outside the actual combustion chamber and to achieve the blending of fuel and air in a section which is not exposed to hot combustion gases.

This section, which is cut off by the guide member, is a mere mixing zone, where the blending or preparing respectively of the mixture to be burned in the combustion chamber takes place. The actual combustion starts in the combustion zone on the other side of the guide member.

An effective design according to the present invention is given when the combustion chambers are in junction with the facing sides. This way an effective transition of gases from the first into the second combustion chamber is accomplished A preferred modification of the invention is the provision of a tangentially extending slot which forms the connection between the two combustion chambers.

The provision of a junction of this particular design at the point of transition from the one combustion chamber to the second, produces a radial flow in direction of the center of the second combustion chamber and thus facilitates a rapid spreading of combustion gases all over the entire second combustion chamber. The tangential arrangement of the slot has the additional advantage of preventing the developing of extensive pressure losses caused by overflow action at the point of transition. This is also promoted by the fact that during the second stage of combustion the combustion gases can disperse above both combustion chambers over the entire piston head.

Although this may not be an absolute requirement, it is recommended to extend the slot between the combustion chambers from the bottom of the combustion chamber to the piston head top edge.

Generally the combustion chambers could be of any suitable design. However, to achieve a perfect combustion to the application of an axially symmetric design is recommended. Generally speaking, the size of the combustion chambers is of minor importance. They can easily be designed identically dimensioned. The injection nozzle can be arranged above the one combustion chamber in such a way that the entire fuel injection is directed into this particular combustion chamber. Another possibility would be an arrangement where the injection nozzle is installed between the combustion chambers, but above the slot connecting the two combustion chambers. This way approximately 90 percent of the fuel is injected into the one combustion chamber and the rest is injected into the second combustion chamber. In this case a premature minor precombustion can take place in the second combustion chamber.

BRIEF DESCRIPTION OF THE DRAWING

A preferred embodiment according to the invention is shown in the drawing and is presented in detail as follows.

DESCRIPTION OF THE PREFERRED EMBODIMENT

Figure 1:
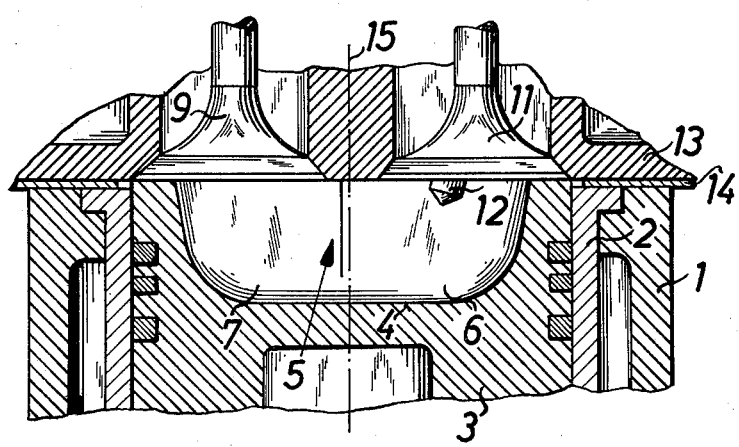
FIG. 1 shows: a section of an internal combustion engine built in accordance with this invention.
Figure 2:
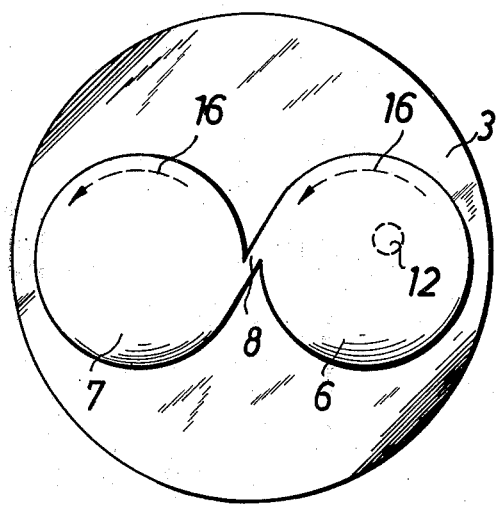
FIG. 2 shows: a top view of the piston of the internal combustion engine during the initial phase of the first stage of combustion.

FIG. 1 shows part of a crankcase of an internal combustion engine which is not pictured in detail. In the crankcase 1 a cylinder sleeve 2 is fitted in a known manner. In said cylinder sleeve 2 a reciprocating piston 3 is supported. In the embodiment shown the piston 3 is in top dead centre position. In the piston head 4 the piston 3 has a combustion chamber 5 which, as can be taken in detail from FIGS. 2 through 5, consists of essentially identical, axially symmetrical combustion chambers 6 and 7. The two combustion chambers 6 and 7 are linked by way of a tangential connecting slot 8. An intake valve 9, a discharge valve 11, and an injection nozzle 12 are arranged above the combustion chambers 6 and 7. Both, the valve 9 and 11, and the injection nozzle 12 are arranged in a cylinder head 13 which, through the intermediary of a cylinder head gasket 14, is bolted onto the crankcase 1 in a manner not shown in detail.

The inlet valve 9 or its inlet port respectively inside the cylinder head 13 is so designed that with the suction stroke or air intake of the piston 3, whereby said piston is moving downward from the position shown in FIG. 1, the aspirated clean air performs a twisting movement around the axis 15 of the cylinder with the effect of creating a vortex motion.

In the following description of the mode of operation of the internal combustion engine or the combustion system respectively with reference to FIGS. 2 through 5, the movement of the clean air is shown by the dash line arrows 16 and the movement of the combustion gases is shown by the solid line arrows 17.

Following the suction stroke of the piston 3, which fills the compression chamber with clean air, the piston 3 begins travelling upward again in direction of the cylinder head 13. The subsequent compression is used to divide the turbulence of the aspirated clean air into two separate, but equiaxial turbulences, as shown by the dash line arrows 16 in FIG. 2, in the two combustion chambers 6 and 7.

Figure 3:
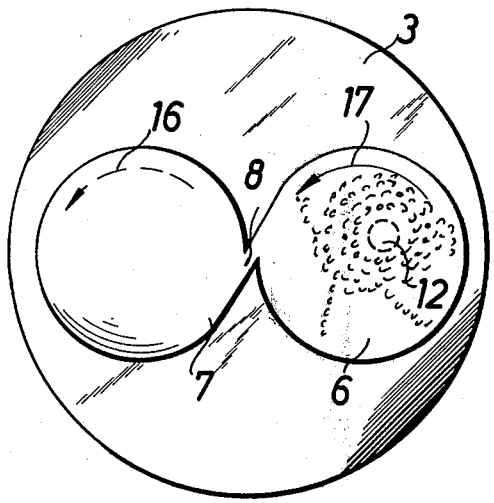
FIG. 3 shows: the same view of the piston during the second phase of the first stage of combustion.
Figure 4:
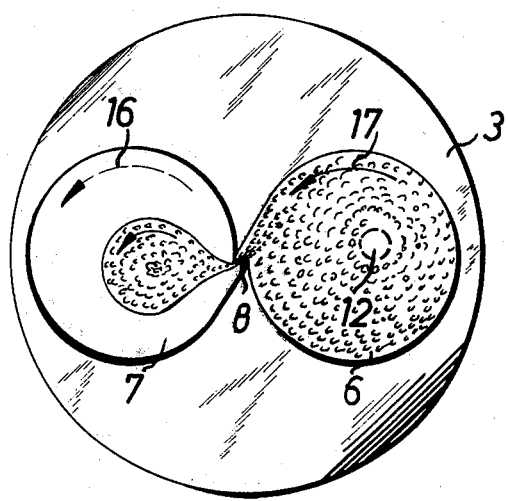
FIG. 4 shows: a top-view of the piston during the initial phase of the second stage of combustion.

During the second phase of the first stage of combustion, as shown in FIG. 3, the full quantity of fuel is injected by the injection nozzle 12 into the combustion chamber 6. Owing to the lack of air prevailing there, only an incomplete combustion at low combustion temperatures takes place which, in turn, results in excessive concentrations of CH hydrocarbons and CO (carbon monoxide, a toxic gas) an almost negligible formation of NO (nitrogen oxide). As shown in FIG. 4, the combustion gases move from the one combustion chamber 6 by way of the tangential slot 8 into the second combustion chamber 7. Owing to the superimposition of the two turbulences represented by arrows 16 and 17 in the combustion chambers 6 and 7, and owing to the low density of the combustion gas in the one combustion chamber 6 a radial flow in direction of the center of the other combustion chamber 7 develops behind the slot 8 at the point of transistion from the first combustion chamber 6 into the second combustion chamber 7.

Owing to the clean air available there, the CH and CO components undergo an extensive process of after-oxidation and form in the second combustion chamber 7 the harmless products $CO_2$ carbon dioxide and $H_2O$ water vapor.

Figure 5:
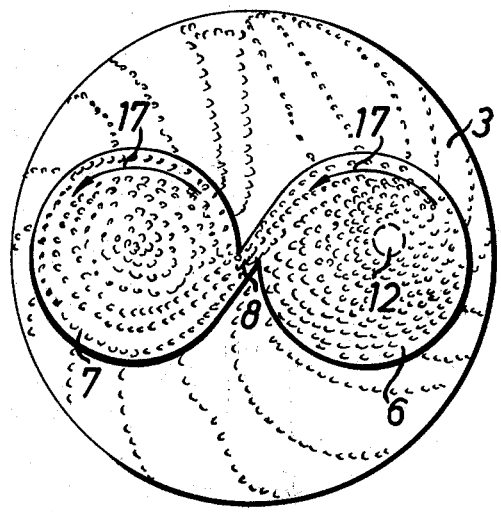
FIG. 5 shows: a top-view of the piston during the second phase of the second stage of combustion.

Due to the above described gas turbulence in the combustion chambers 6 and 7 and also due to the radial transition of gas from the one combustion chamber into the other, this process of after-oxidation is absolute and takes place within a very short period of time. As can be seen in FIG. 5 the gases disperse over the entire piston head during the subsequent combustion phase and there are next to no losses by overflow action of the gas at the throttle point.

It stands to reason that this invention is not limited to the embodiment shown, but also permits modifications within the scope of the claims. The combustion chambers could also be arranged in a position concentric to each other, in other words, the one combustion chamber 6 could be arranged in the center of the piston, and the other combustion chamber 7 could be arranged all around the first combustion chamber 6 along the edge of the piston head. This way comparatively large combustion chambers can be accommodated and flow pressures at the upper dead centre can be kept to a minimum. With this arrangement several transition slots are possible between the two combustion chambers 6 and 7. Fundamentally it is also possible to provide more than two combustion chambers which would make feasible a combustion in several stages. Furthermore, the intake and discharge valves can be arranged differently. Also the intake valve could easily be used as discharge valve and vice versa; neither does the injection nozzle have to be arranged at the position shown in the drawing. It could also be positioned above the tangential slot 8 between the combustion chambers 6 and 7; in particular in cases where approximately 90 percent of the fuel is to be injected into the first combustion chamber 6 and approximately 10 percent of the fuel into the second combustion chamber 7.

Ultimately it can be said that it is also possible to use the combustion system according to this invention on an internal combustion engine with revolving piston (Wankel engine).

I claim:

1. A compression-ignition engine of the type having a cylinder, a piston having two cavities formed in the crown thereof and being reciprocably carried in the cylinder, a cylinder head closing one end of the cylinder and having an air inlet passage means for directing air into the closed end of the cylinder during an induction stroke of the piston, and a fuel injection nozzle means carried on the cylinder head for injecting fuel into the closed end of the cylinder near the end of a compression stroke of the piston, wherein the improvement comprises:

the two cavities in the piston crown being cylindrical and forming two deep pan-shaped depressions which are spaced apart equidistantly on opposite sides of the center of the piston crown;

the piston crown having a slot communicating the depressions, the slot having a depth extending substantially to the bottom of the depressions and having two parallel walls each of which extends tangentially from a respective cylindrical surface of each depression; and the fuel injection nozzle means having a discharge end projecting into the cylinder to a depth that the discharge end extends into one of the depressions in the piston crown at the end of the compression stroke of the piston.

2. A compression-ignition engine according to claim 1, wherein the slot extends through the center of the piston crown.

3. An internal combustion engine according to claim 1, wherein the air inlet passage is located adjacent the second depression.

4. A compression-ignition engine according to claim 1, wherein the cylinder head further includes an exhaust passage which is located adjacent the one depression.

5. A compression-ignition engine according to claim 2, wherein the air inlet passage is located adjacent the second depression.

6. A compression-ignition engine according to claim 2, wherein the cylinder head further includes an exhaust passage which is located adjacent the one depression.

7. A compression-ignition engine according to claim 3, wherein the cylinder head further includes an exhaust passage which is located adjacent the fuel injection nozzle means.

8. A compression-ignition engine according to claim 7, wherein the passages are each provided with a control valve which opens into the cylinder.

9. A compression-ignition engine according to claim 1 wherein the depressions are symmetrical in size, shape and depth.

* * * * *